Feb. 12, 1924.                               1,483,401
           F. E. WOLCOTT
         CONDIMENT CONTAINER
         Filed Dec. 27, 1922
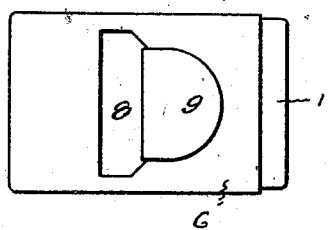
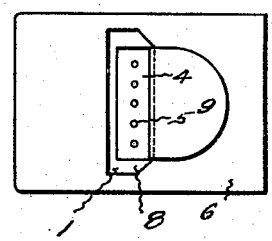
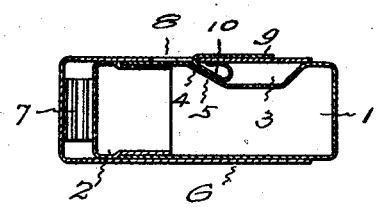
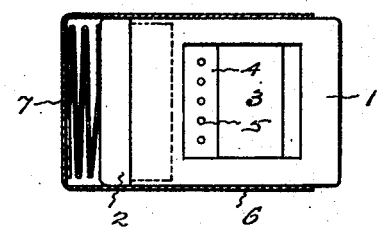
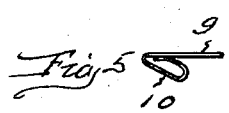
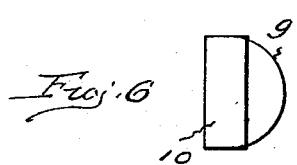
INVENTOR
Frank E. Wolcott
by Harry R. Williams
   atty Patented Feb. 12, 1924.

1,483,401

UNITED STATES PATENT OFFICE.

FRANK E. WOLCOTT, OF HARTFORD, CONNECTICUT.

CONDIMENT CONTAINER.

Application filed December 27, 1922. Serial No. 609,306.

*To all whom it may concern:*

Be it known that I, FRANK E. WOLCOTT, a citizen of the United States, residing at Hartford, in the county of Hartford and State of Connecticut, have invented a new and useful Improvement in Condiment Containers, of which the following is a specification.

This invention relates to the class of containers which are used to hold salt, pepper, spices and the like granulated and powdered condiments, and which are provided with perforations whereby the contents may be shaken or sprinkled therefrom.

The object of the invention is the provision of a simple and cheap device of this nature which normally is tightly closed so as to exclude moisture and protect the contents from deterioration resulting from atmospheric exposure, but which is easily opened by mere pressure between the thumb and finger of the hand which picks up the container when it is desired to sprinkle some of the contents on food.

This object is attained by arranging the box for holding the condiment, which box has a cover that is easily removed for filling and perforations in one side for the escape of the contents when shaken, in a casing that has a spring which normally presses the box outwardly in such manner that a part of the casing tightly closes the outlet perforations. When the box is pressed into the casing the holes are exposed so that the contents of the box can be shaken out.

In the accompanying drawings Figure 1 shows a bottom view of a container in closed condition. Fig. 2 is a similar view in open condition. Fig. 3 is a central longitudinal section of the container. Fig. 4 is a view with the bottom wall of the casing cut away. Fig. 5 is an edge view of the plate which is provided for locking the box in the casing. Fig. 6 is a plan of the lock plate.

The article may be made of metal, celluloid or other material, preferably metal, of any desired size and approved configuration. The box 1 which is designed to hold the condiment has a removable cover 2 at one end. When the cover is off the box can be filled. When the cover is in place the end of the box is closed. In the bottom wall of the box is a depression 3 and in a sloping wall 4 of this depression are perforations 5. This box has a slidable fit in a casing 6 which is open at one end to permit the insertion of the box. At the closed end of the casing is a spring 7. When the box is pushed into the casing this spring tends to thrust it out. In the bottom wall of the casing is an opening 8. When the box is pushed in against the thrust of the spring the perforations in the box are exposed through the opening in the casing, as shown in Fig. 2. When the pressure is removed from the end of the box the spring thrusts the box back so that the perforations are concealed beneath the casing. A bent plate 9 is removably applied to the bottom wall of the casing adjacent to the opening in such position that its inner section will bear against the sloping wall in the recess in the box when the box is thrust out by the spring and tightly close the perforations in the wall of the box. The inner section of this plate is also bent so that its end 10 impinges against the wall of the casing and tends to hold the plate in position. The engagement of the sloping wall of the inner section of this plate which closes the perforations through the sloping wall of the box also prevents the spring from pushing the box entirely out of the casing.

To obtain some of the contents of the box all that is necessary is to pick it up with a finger at one end and the thumb at the other end and press. This pushes the box inward against the spring and exposes the perforations through the opening in the wall of the casing in such manner that the contents may be sprinkled out of the box through the perforations. When pressure is removed from the end of the box the spring thrusts it outward and the perforations become closed by the locking plate. In order to remove the box from the casing for filling it is only necessary to press the box inward and slip the locking plate out from the opening. The box is then free to be removed from the casing and its cover taken off.

This box is very simple to manipulate, it is cheap to construct and the contents are protected from the atmosphere.

The invention claimed is:—

1. A container comprising a box having perforations in one wall, a casing in which the box is slidably fitted, said casing having an opening adjacent to the perforations in the box, means extending from the casing and normally bearing on the wall of the box over the perforations, and a spring normally holding the box with the perforations beneath a wall of the casing and closed by said means, said spring permitting the box to be moved in the casing so as to expose the perforations through the opening in the casing.

2. A container comprising a box having perforations in one wall, a casing in which the box is slidably fitted, said casing having an opening adjacent to the perforations in the box and a plate adapted to bear against the wall of the box and normally close the perforations, and a spring normally holding the box with the perforated wall against said plate, said spring permitting the box to be moved in the casing so as to expose the perforations through the opening in the casing.

3. A container comprising a box having perforations in one wall, a casing in which the box is slidably fitted, said casing having an opening adjacent to the perforations in the box, a plate removably attached to the wall of the casing and limiting the outward movement of the box, and a spring normally holding the box with the perforations closed by a portion of said plate, said spring permitting the box to be so moved as to carry the perforations away from the closing plate and expose the perforations through the opening in the casing.

4. A container comprising a box having a depression in one wall with perforations in a wall of the depression, a casing in which said box is slidably fitted, said casing having an opening adjacent to said depression in the box, means extending from the opening in the casing into said depression and adapted to close the perforations therein, and a spring normally holding the box with said means closing said perforations, said spring permitting the box to be moved in the casing so as to carry said perforations away from said means and at the same time expose the perforations through the opening in the casing.

5. A container comprising a box having a depression with a sloping perforated side in one wall of the box, a casing in which said box is slidably fitted, said casing having an opening adjacent to said depression in the box, a yielding piece extending from the opening in the casing and adapted to bear against the sloping wall of the depression and close the perforations therein, and a spring normally holding the box with said yielding piece bearing against said sloping wall and normally closing the perforations therein, said spring permitting the piece to be moved in the casing so as to carry said perforations away from said yielding piece and at the same time expose the perforations through the opening in the casing.

6. A container comprising a box having a depression with a sloping perforated side in one wall of the box, a casing in which said box is slidably fitted, said casing having an opening adjacent to said perforations in the box, a locking plate removably attached to the casing and extending through the opening therein into said depression and adapted to bear against the sloping wall thereof and close the perforations therein, and a spring normally holding the box with said locking plate bearing against said sloping wall and normally closing the perforations, said spring permitting the box to be moved inward in the casing so as to carry the perforations in the box away from the locking plate and expose the perforations through the opening in the casing.

FRANK E. WOLCOTT.